United States Patent [19]
Hanson

[11] Patent Number: 6,023,624
[45] Date of Patent: *Feb. 8, 2000

[54] LOCATION BASED PAGING FOR MOBILE TELEPHONE UNITS

[75] Inventor: Robert Joseph Hanson, Naperville, Ill.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,138

[22] Filed: Dec. 24, 1996

[51] Int. Cl.[7] .................................................. H04Q 7/20
[52] U.S. Cl. ......................... 455/458; 455/422; 455/435
[58] Field of Search .................................. 455/403, 418, 455/422, 432, 433, 435, 456, 458

[56] References Cited

U.S. PATENT DOCUMENTS

| | | |
|---|---|---|
| 4,876,738 | 10/1989 | Selby ....................................... 455/435 |
| 5,305,466 | 4/1994 | Taketsuqu . |
| 5,369,681 | 11/1994 | Boudreau et al. ....................... 455/458 |
| 5,408,683 | 4/1995 | Ablay et al. ............................. 455/433 |
| 5,613,199 | 3/1997 | Yahagi ..................................... 455/435 |
| 5,649,289 | 7/1997 | Wang et al. ............................. 455/433 |

OTHER PUBLICATIONS

D.B.DeVaney: Virtual Location Areas; Cellular Business, Nov. 1994, pp. 57–64.

*Primary Examiner*—Dwayne D. Bost
*Assistant Examiner*—Nay Maung

[57] ABSTRACT

An arrangement for paging mobile telephone units (MTU) in a cellular mobile system that conserves paging resources. If the identity of the most recent cell in which the MTU was located matches the identity of the cell wherein the MTU was location on the previous registration, then an initial page covering only the cell of the most recent call location for the target MTU, and the neighboring cells for that cell, is used. Advantageously, since the likelihood that the MTU is still within that cell or its neighbors is high, so that paging resources are conserved by paging in only a small number of cells.

18 Claims, 5 Drawing Sheets

LOCATION BASED PAGING FOR MOBILE TELEPHONE UNITS

RELATED APPLICATION

This application is related to an application by R. J. Hanson entitled "Time Based Paging for Mobile Telephone Units" being filed concurrently herewith and being assigned to the assignee of this application.

TECHNICAL FIELD

This invention relates to the arrangement for paging cellular mobile telephone units in a wireless cellular telecommunications system.

PROBLEM

Wireless cellular telecommunications systems have become popular in the past decades because such systems allow reuse of the same radio channel in many different cells in the metropolitan area, thus greatly increasing the number of simultaneous communications in that area. With a cellular system, it is necessary to know where a wireless cellular mobile telephone unit (MTU) is located in order to communicate with that MTU from a base station in the same cell as that MTU. When an MTU originates, a call its signal is detected by the nearest base station; the act of originating transmits a radio signal which allows an MTU to be located. However on a terminating call, the wireless cellular system may not know where the terminating MTU (target MTU) is to be found. This problem is solved by sending a paging signal identifying the target MTU and having that MTU respond to the page. The paging is performed over a paging channel to which the MTU is tuned when power is on but the MTU is idle. The MTU tunes to the strongest paging channel when it is moving, if the present paging channel signal drops below a threshold.

In the earliest wireless systems, paging for any station was done throughout a metropolitan area. However as the volume of traffic increased, it was found necessary to restrict the paging to a much smaller area, a zone, in order to preserve the bandwidth of the paging channels.

In order to permit the system to locate a zone, i.e., a predefined plurality of adjacent cells, wherein the target MTU is most likely to be found, a MTU performs a periodic autonomous registration process wherein it transmits a signal to indicate its identity; the transmitted signal allows the cellular system to locate the cell in which the MTU can presently be found.

A problem of the prior art is that even initially paging only in all cells of a zone and, if the target station is not found in the zone, paging in all cells served by a mobile switching center limits the capacity of the mobile switching center.

SOLUTION

The above problem is significantly alleviated and an advance is made in accordance with applicant's invention wherein the decision on the type of initial page to be performed is based upon the identity of the cell in which the target MTU was most recently located (new cell), on the identity of the cell wherein the target MTU was previously found (i.e., at the last registration or location prior to the most recent registration or location) (old cell) and the elapsed time since the most recent registration or location; for a short elapsed time coupled with a match of the identity of the cell of the most recent registration and the cell of the prior registration, the initial page only pages the target MTU in the cell of the most recent registration and its immediate neighbor cells. Advantageously, such an arrangement uses data which implies that a target MTU may not have moved far to perform an initial page in a more restricted area in order to conserve paging resources.

In accordance with a feature of applicant's invention, a test is made to determine if the target MTU has moved only a neighboring cell between the two most recent registrations. If so, an initial page is performed only in the cell where the target MTU was most recently registered and the neighbors of that cell.

In accordance with one feature of applicant's invention, if the cells are small because of the high density of traffic in a particular area served by an MSC, then the initial page of one cell and its neighbors is enhanced to page the neighbors of those neighbors as well, since the space over which the target MTU may have traveled is likely to include a larger number of cells.

DETAILED DESCRIPTION

Figure 1:
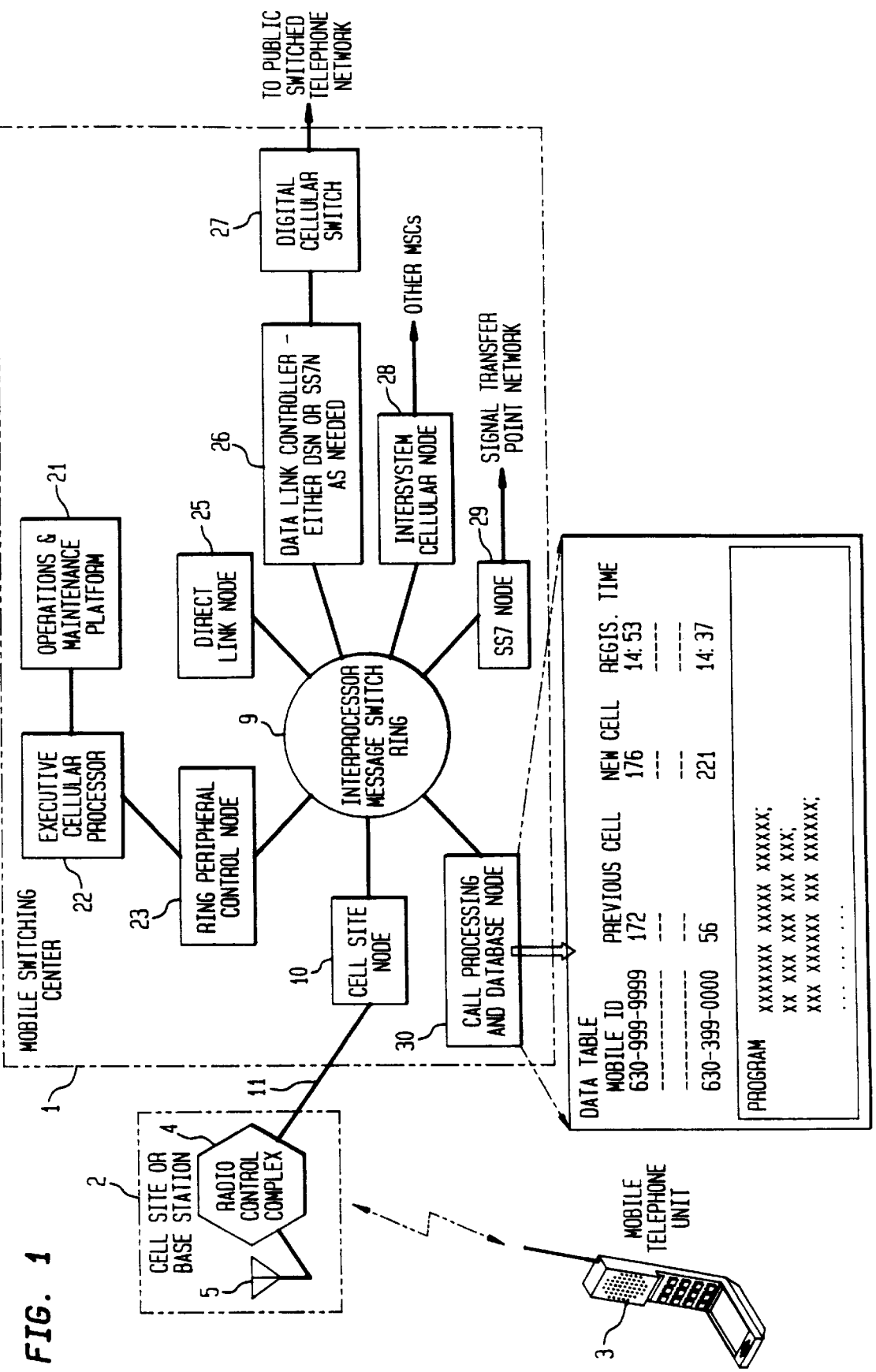
FIG. 1 is a block diagram of a preferred embodiment of applicant's invention.

FIG. 1 is a block diagram of a mobile switching system. The central switching element of this system is a mobile switching center (MSC) 1. The mobile switching center communicates via a plurality of voice paths (not shown) and a control link with a cell site or base station 2. The cell site in turn communicates by radio with a cellular mobile telephone unit 3. Inside the cell site is a radio control complex (RCC) 4 connected to an antenna 5 for communicating radio signals with the MTU 3. The MSC in applicant's preferred embodiment is an Autoplex® 1000 system generally described in U.S. Pat. No. 4,827,499. The MSC includes an interprocessor message switch 9 in the form of a ring data switch for interconnecting the major units of the MSC. A cell site node CSN 10 connected to IMS ring 9 is used for communicating with the cell site via data link 11; in particular, one or more CSNs are used to transmit paging request messages over data links 11 to cell sites to request them to page a target MTU. The backup database is an operations and maintenance processor (OMP) 21 which communicates with an executive cellular processor (ECP) 22 which in turn communicates with the Ring Peripheral Control Node (RPCN) 23 for supplying data concerning the MTUs served by the MSC.

A direct link node (DLN) 25 is used for controlling communications among the units connected to the IMS ring 9 destined for units outside the nodes of the ring. Also connect to IMS ring 9 is a data link controller DLC 26 for transmitting signaling messages to a digital cellular switch (DCS) 27. This digital cellular switch can be, for example a 5ESS® switch or a Definity® PBX switch, both manufactured by Lucent Technologies Inc. This digital cellular switch has connections (not shown) to the voice channels to the cell sites controlled by MSC 1 and also has voice channels connected to the public switched telephone network (PSTN) for communicating with land based lines or other mobile switching centers. Inter MSC connection node (ICN) 28 is used to communicate data messages to other MSCs. Signaling system 7 node (SS7N) 29 is used to communicate signaling messages to the signal transfer point (STP) network in order to transmit these messages to another switch such as another MSC.

Finally, call processing and database node (CDN) 30 is used for controlling cellular calls. The CDN includes a processor for controlling the paging process. The processor includes a central processing unit (not shown) and memory for storing program text and data, shown in FIG. 1 The decision of which cells to perform a page for any call at any particular time is made in this node. The node includes a processor that contains both a data table and a program. Part of the program is used to implement the processes described in FIG. 5. In addition, and, where necessary, in cooperation with RPCN 23, the CDN maintains a record of the most recent location ("new cell") where a particular MTU was most recently located and the time of the registration or location of that MTU as well as the cell in which the MTU was previously located ("previous cell").

Figure 2:
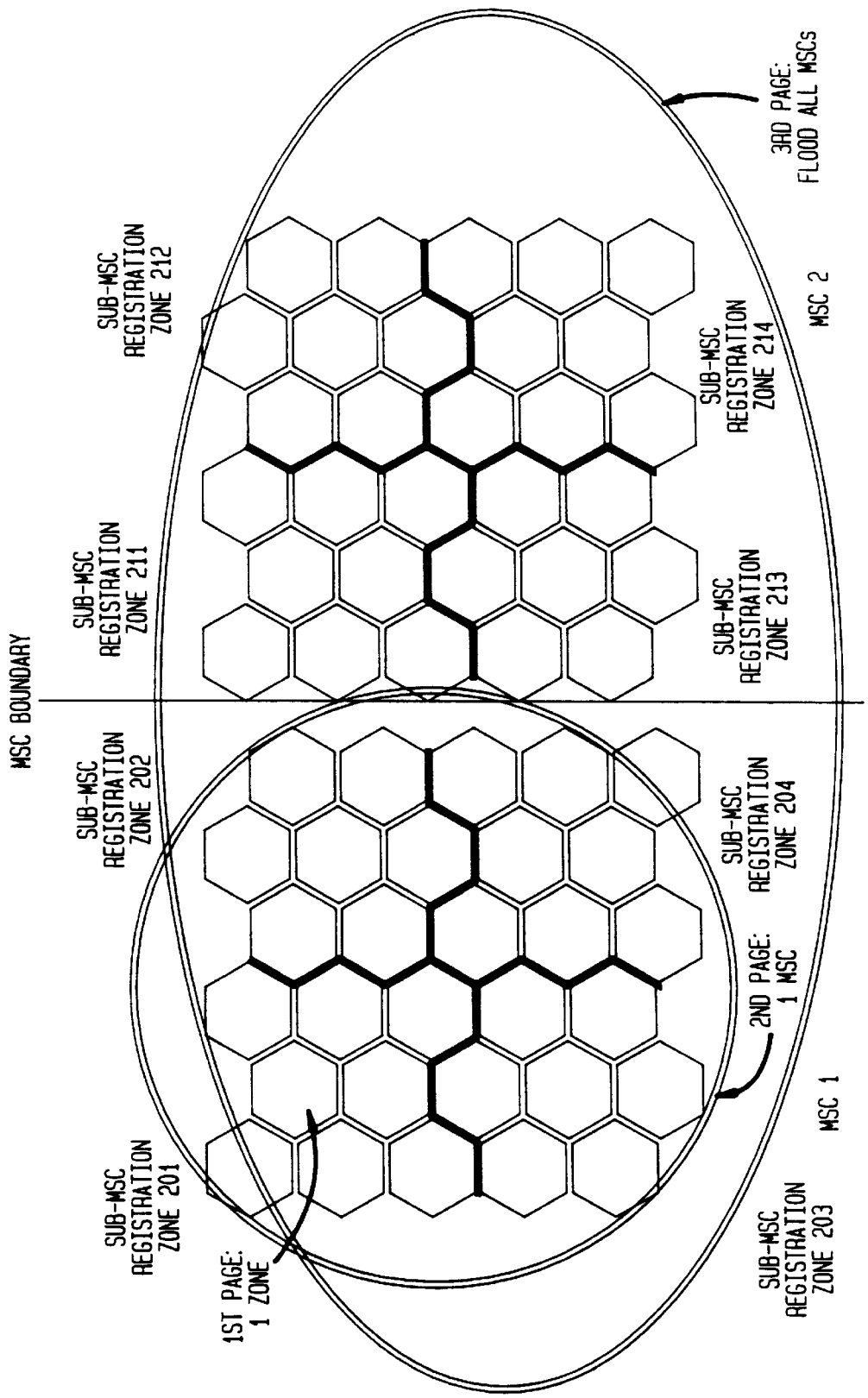
FIG. 2–4 illustrate cellular division of a metropolitan area and the various cellular arrangements, including applicant's new selective paging arrangement, in which mobile telephone units can be paged.

FIG. 2 illustrates the prior art arrangement for paging a target MTU. Shown are 8 zones in two mobile switching centers. Each zone comprises a plurality of cells not all of which are shown on the diagram. The heavy line shows the demarcation between zones. A typical paging operation would initially page from all the cells of one zone, such as zone 201. If that page failed to locate the target MMT, then all cells of all zones controlled by 1 MSC such as zones 201, 202, 203, and 204 would be paged. If this still did not succeed in locating the target MTU then a so-called flood paging would be tried. This would be a paging of all zones of all the MSCs in an area. In this case, where the area is controlled by two MSCs, the flood paging would be a paging of all cells in zones 201, 202, 203, 204, 211, 212, 213 and 214.

Figure 3:
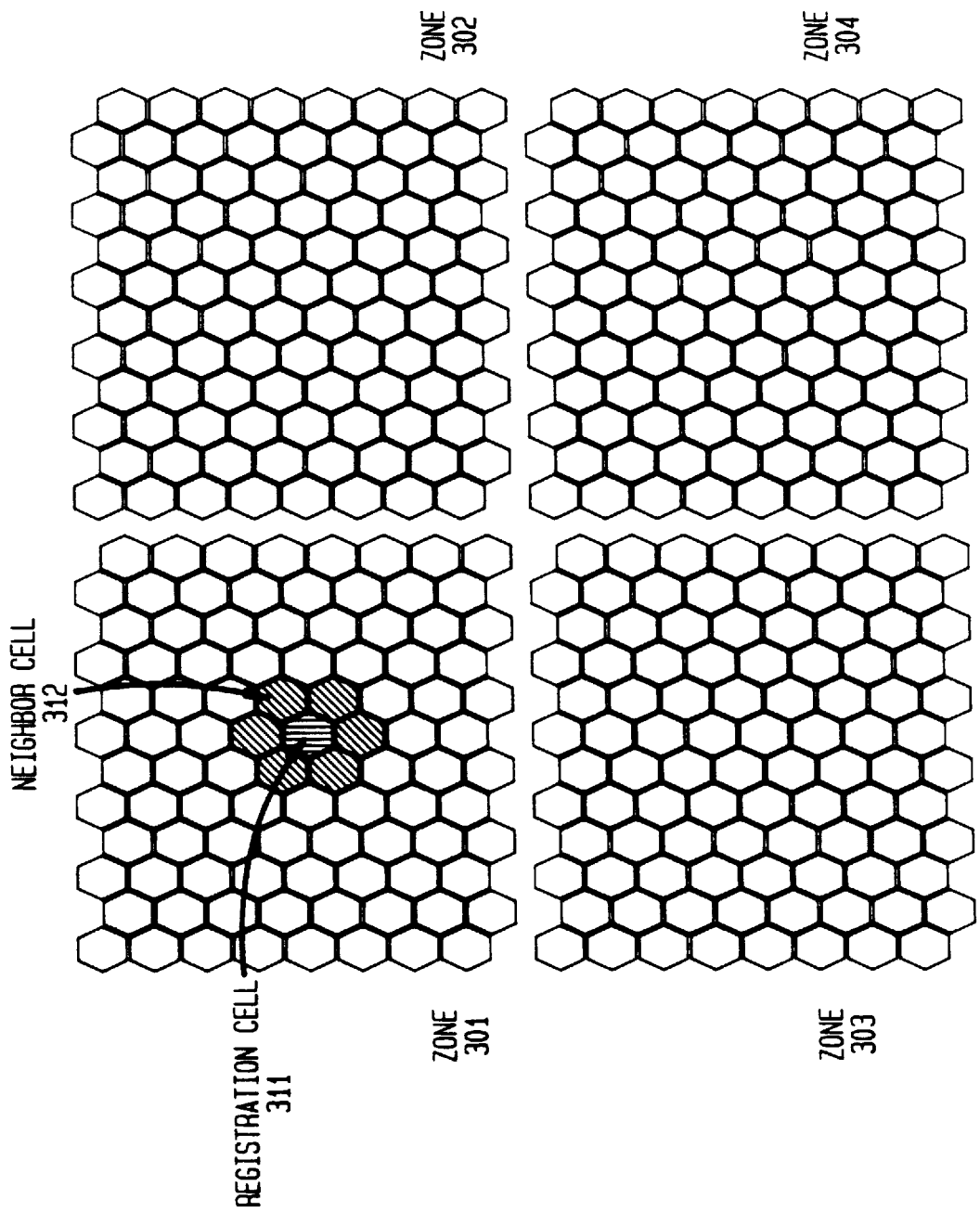

FIG. 3 shows some of the concepts that are used to support applicant's invention. This diagram also shows four zones controlled by one MSC, namely zones 301, 302, 303 and 304. Within zone 301 a registration cell, 311, is shown. This is the cell in which the MTU was found at the time of the most recent registration or location. Surrounding registration cell 311 are six neighbor cells such as cell 312.

Figure 4:
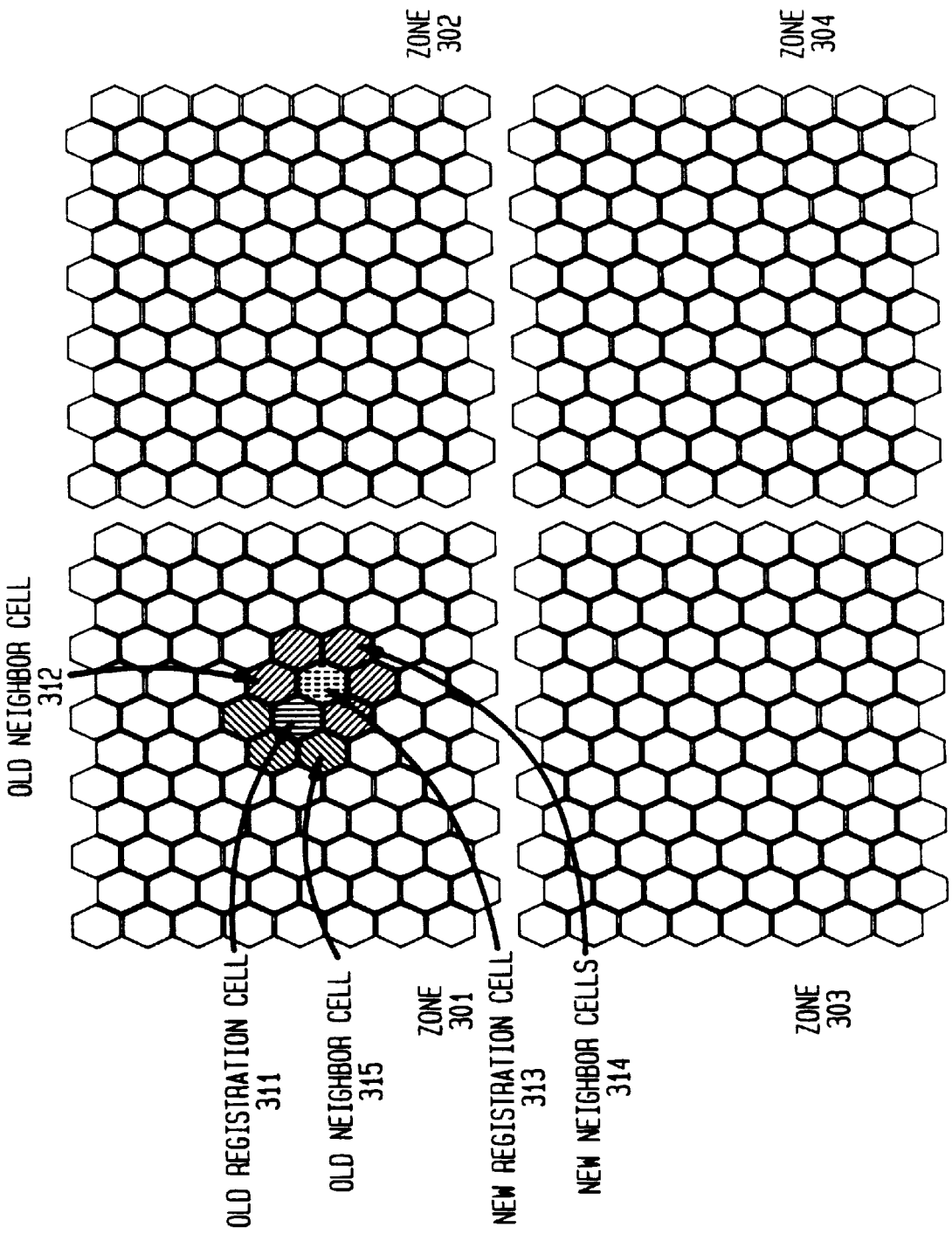

FIG. 4 shows that when a mobile moves, for example from its initial position in cell 311 to a new position in cell 313, the new registration cell 313 has new neighbor cells, such as cell 314, which were not previously a neighbor cell, and some previous neighbor cells, such as cell 315, which are no longer neighbor cells of the new registration cell.

Figure 5:
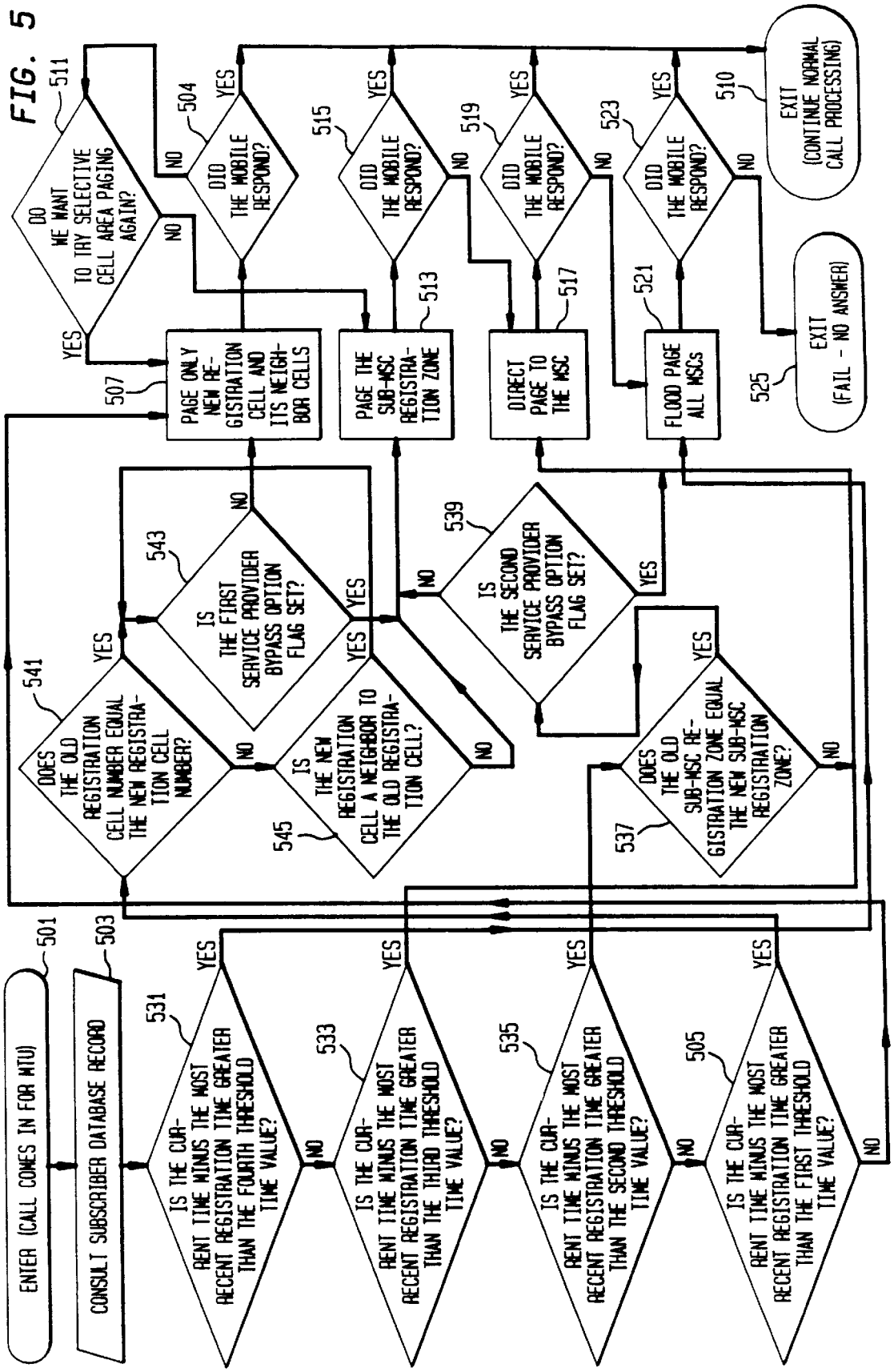
FIG. 5 is a flow diagram of an arrangement for controlling paging in accordance with applicant's invention.

FIG. 5 is a flow diagram illustrating the process used to control paging in accordance with applicant's invention. The process is controlled by the processor of the CDN. The basic objective is to try to anticipate cases wherein the target MTU is likely to be close to the cell where it was most recently found. Close can be that cell plus a ring of immediate neighbors, that cell plus two rings of neighbors, or simply a list of cells defining a neighborhood for each cell. When it is anticipated that the MTU is close to the cell where it was most recently found, an initial page restricted to that cell and cells close to it, as discussed herein, is likely to find the target MTU.

The process starts when a call comes in for the target MTU (enter block 501). The subscriber database record is consulted (action block 503) to determine the time of the most recent registration or other location action and to find the identification of the cell in which the MTU was most recently found (new cell). Test 531 is used to determine whether the elapsed time since the most recent registration exceeds a fourth threshold time value. (Thresholds are listed in order of magnitude: the first threshold is the smallest, the fourth threshold is the largest.) If so, then flood paging (action block 521) and the subsequent actions (described hereinafter) are executed. If test 531 indicates that the fourth threshold has not been exceeded, then test 533 is used to determine whether a third threshold time value has been exceeded since the last registration. If so, then MSC paging (action block 517) and the subsequent actions (described hereinafter) are executed.

If test 533 indicates that the third threshold has not been exceeded, then test 535 is used to determine whether second threshold time value has been exceeded since the last registration. If so, then test 537 is used to determine whether the MTU was in the same zone during the last two registrations. If not, then action block 517 (MSC paging) and the subsequent actions are executed. If so, then test 539 is used to determine whether a second option flag, controlled by the operator of the MSC, has been set. If so, then action block 517 (MSC paging) is executed; if not, action block 513 (zone paging) and the subsequent actions are executed.

If the result of test 535 indicates that the second threshold has not been exceeded, then test 505 is entered to determine whether a first threshold has been exceeded. If so, then test 541 is used to determine whether the registration cell numbers of the two most recent registrations are equal. If so, then test 543 is used to determine whether a first option flag, controlled by the operation of the MSC, has been set. If not, then action block 507 (selective paging of the new registration cell and its immediate neighbors) and the following actions (described hereinafter) are executed. If the first option flag has been set, then zonal paging (action block 513) and the subsequent actions are executed. If the result of test 541 indicates that the old cell and new cell identities do not match, then test 545 is used to determine whether the new cell is a neighbor of the old cell. If so, test 543 and the subsequent actions are performed; if not, then action block 513 (zone paging) and the subsequent action are performed. Test 505 is used to determine if the elapsed time since the most recent registration or location exceeds a first threshold. If not, this is an indication that the MTU is likely to be near its previous location and therefore that only the new registration cell and its neighbors should be paged (action block 507).

Note that if the cells are very small because of the high volume of traffic in the area, the neighboring cells can be extended to include two rings of neighbors. The decision on one versus two rings of neighbors is made based on a parameter set by the cellular operator, as well as whether or not the selective page had already been tried once.

Test 509 is used to determine whether the mobile responded to the page of action block 507. If the mobile has responded, then the normal call processing for the call is continued (exit block 510). If the mobile has not responded, then test 511 is used to determine whether the selective cell area paging is to be tried again. If so, action block 507 is reentered. If selective cell paging is not to be tried again, then the cellular system performs sub-MSC (zonal) paging (action block 513). Test 515 is used to determine whether the mobile responded. If so, then normal call processing is continued (action block 510). If not, then MSC paging is performed (action block 517) wherein test 519 is used to determine whether the mobile responded; if so, then normal call processing is continued (action block 510). If not, then flood paging is performed (action block 521) and normal call processing is continued following flood paging.

Normal call processing in this case comprises test 523 to determine whether the MTU responded to the page. If so, then exit 510 (normal call processing with answer) is executed; if not, the "No Anwer" exit (exit block 525) is executed.

This arrangement performs selective paging when it is likely to be useful, and also skips the zonal paging or even the MSC paging when these steps are not as likely to yield positive results. Advantageously, this saves paging resources when selective paging can be used and save some resources, but also saves substantial setup time when zonal paging is not likely to yield positive results.

In this specific embodiment, only an exact match of new cell and previous cell identities, or an indication that the new cell is a neighbor of the old cell is considered. This situation will be referred to as one in which the old cell and new cell are close. The concept of "close" can include identity, immediate neighborhood, or relatively close neighborhood. Close cells can be listed in a table for each cell.

A possible objection to an increased number of possible pages might be an increase of call holding time. This might be compensated for by decreasing the length of time for each page.

This detailed description is of one preferred embodiment of applicant's invention. Many options are possible within the scope of this invention. For example, any of the option flags can be permanently set by the manufacturer. The skip to immediate flood paging or even MSC paging need not be provided. The various time thresholds can be set or changed by the MSC operator or by the manufacturer, based upon operating experience. The match of new and old cell identities, or near match of these identities can be a trigger to the selective paging even if longer time intervals have elapsed. The arrangement can be broadened to store 3 or even more most recent locations, and to base the decision on initial restricted paging on these three or more recent location. The repetition of the initial selective page need not be provided. The scope of the invention is thus only limited by the claims.

I claim:

1. In a cellular wireless telecommunication system, a method of paging a terminating target MTU (mobile telephone unit) comprising the steps of:

recording an identity of a new cell in which said target MTU was found in a most recent location process;

recording a time of day when the new cell identity was recorded;

retaining a previous cell identity;

wherein an area served by said cellular wireless telecommunication system comprises a plurality of location areas, and each location area comprises a plurality of cells;

wherein each cell is served by a base station, and each base station emits a different set of communication signals;

responsive to a request to page said target MTU, determining whether an elapsed time since said new cell identity was recorded is less than a pre-defined threshold;

if said elapsed time is less than said pre-defined threshold, determining if the previous cell is within a pre-defined neighborhood of the first cell; and if said determining finds that said, previous cell is within a pre-defined neighborhood of said new previous cell, paging initially only over the identified new cell and the cells neighboring to that cell;

if said elapsed time is greater than said pre-defined threshold, paging initially over a larger group of cells than if said elapsed time is less than said pre-defined threshold and said previous cell is within said pre-defined neighborhood;

wherein said cells neighboring to that cell need not be in a common location area.

2. The method of claim 1 wherein the step of paging initially comprises the step of paging initially over said new cell and immediate neighbors of said new cell.

3. The method of claim 1 wherein the step of paging initially comprises the step of paging initially over said new cell and two rings of neighbors of said new cell.

4. The method of claim 1 wherein the step of paging initially comprises the step of paging initially over said new cell and cells stored in a table corresponding to said new cell.

5. The method of claim 1, wherein the determining step comprises the step of:

determining whether the previous cell identity and new cell identity match.

6. The method of claim 1, wherein the determining step comprises the step of:

determining whether the previous cell and new cell are the same cell or immediate neighbors.

7. The method of claim 1, wherein the determining step comprises the step of:

determining whether the previous cell and new cell are the same cell, immediate neighbors, or neighbors of immediate neighbors.

8. The method of claim 1, wherein the determining step comprises the step of:

determining whether the previous cell is listed in a table of close cells for said new cell.

9. The method of claim 1, further comprising the steps of:

if said determining finds that said cells are not within said pre-defined neighborhood, further determining if said cells are in a common zone;

if said cells are in a common zone, performing a zone paging process.

10. The method of claim 1, further comprising the steps of:

if said determining finds that said cells are not within said pre-defined neighborhood, further determining if said cells are in a common zone;

if said cells are in a common zone, performing a zone paging process if an elapsed interval of time since said time when said new cell identity was recorded is less than a predetermined threshold.

11. The method of claim 1, further comprising the steps of:

if said determining finds that said cells are not within said pre-defined neighborhood, further determining if said cells are in a common zone;

if said cells are not in a common zone, bypassing a zone paging process if an elapsed interval of time since said time when said new cell identity was recorded is more than a predetermined threshold.

12. The method of claim 1 further comprising the step of:

if said initial paging fails to elicit a response from said target MTU, repeating said initial paging.

13. The method of claim 1, further comprising the steps of:

if said determining finds that said cells are not within said pre-defined neighborhood performing an immediate flood page if an elapsed time since said time when said new cell identity was recorded is more than a predetermined threshold.

14. The method of claim 1, further comprising the steps of:

if said determining finds that said cells are not within said pre-defined neighborhood performing an immediate page of all cells served by a mobile switching center if an elapsed interval of time since said time when said new cell identity was recorded is more than one threshold but does not exceed a second threshold.

15. The method of claim 1, further comprising the steps of:

if said determining finds that said cells are not within said pre-defined neighborhood performing an initial zone page if an elapsed interval of time since said time when said new cell identity was recorded is more than a first threshold but does not exceed a second threshold.

16. In a cellular wireless telecommunication system, apparatus for controlling paging of a terminating target MTU (mobile telephone unit), comprising:

means for communicating with a plurality of base stations; and processor means for controlling transmission of page request messages to selected ones of said plurality of base stations;

wherein an area served by said cellular wireless telecommunication system comprises a plurality of location areas, and each location area comprises a plurality of cells;

wherein each cell is served by a base station, and each base station emits a different set of communication signal;

said processor means operative under the control of a program for:

recording identities of a first cell in which said target MTU was found in a most recent location process and a second cell which was located in location process most recently preceding said most recent location process;

recording times when said first cell and said second cell were located;

responsive to receipt of a paging request, determining whether an elapsed time since said first cell was recorded, is less than a pre-defined threshold;

if said elapsed time is less than said pre-defined threshold, determining if said second cell is within a pre-defined neighborhood of said first cell; and if said second cell is within said pre-defined neighborhood, performing an initial page that is more restricted than a zonal page;

wherein said cells neighboring to that cell need not be in a common location area.

17. The apparatus of claim 16, wherein said second cell is within said pre-defined neighborhood if said second cell is listed in a list of cells close to said first cell stored in said system.

18. The apparatus of claim 16 wherein said initial page is restricted to cells listed for a restricting paging for said first cell.

* * * * *